United States Patent
Lucidarme

(10) Patent No.: US 8,660,552 B2
(45) Date of Patent: Feb. 25, 2014

(54) DEVICE AND SYSTEM FOR SUPPRESSION OF INTERFERENCE LINKED TO DISTANT PATHS

(75) Inventor: Thierry Lucidarme, Montigny le Bretonneaux (FR)

(73) Assignee: Thales, Neuilly sur Seine ( * ) Notice: Subject to any disclaimer, the term of this patent is extended or adjusted under 35 U.S.C. 154(b) by 117 days.

(21) Appl. No.: 13/513,793

(22) PCT Filed: Dec. 2, 2010

(86) PCT No.: PCT/EP2010/068777
§ 371 (c)(1),
(2), (4) Date: Jun. 28, 2012

(87) PCT Pub. No.: WO2011/067357
PCT Pub. Date: Jun. 9, 2011

(65) Prior Publication Data
US 2012/0282873 A1  Nov. 8, 2012

(30) Foreign Application Priority Data
Dec. 4, 2009 (FR) ...................... 09 05870

(51) Int. Cl.
*H04W 4/00* (2009.01)
(52) U.S. Cl.
USPC ............................. 455/431; 701/4
(58) Field of Classification Search
USPC ......... 455/431, 428, 430; 701/4, 13; 340/961, 340/970, 974, 977
See application file for complete search history.

(56) References Cited

U.S. PATENT DOCUMENTS

| | | | | |
|---|---|---|---|---|
| 5,786,773 A * | 7/1998 | Murphy | ................ | 340/947 |
| 6,324,398 B1 * | 11/2001 | Lanzerotti et al. | ............ | 455/431 |
| 6,507,739 B1 * | 1/2003 | Gross et al. | ................... | 455/431 |
| 7,920,860 B2 * | 4/2011 | Chari et al. | ................... | 455/431 |
| 8,082,099 B2 * | 12/2011 | Latif | ............................ | 701/472 |
| 2002/0005799 A1 | 1/2002 | Beisner | | |

FOREIGN PATENT DOCUMENTS

GB  2405059 A  2/2005
WO  2007/059560 A1  5/2007

OTHER PUBLICATIONS

T. Lucidarme; "Principes de Radiocommunication de Troisième Génération"; Vuibert, 2002; 5 pages.
A. A. Giordano, et al;"Least Square Estimation with Applications to Digital Signal Processing"; pp. 189-195; John Wiley & Sons, 1985.

* cited by examiner

*Primary Examiner* — Sonny Trinh
(74) *Attorney, Agent, or Firm* — Baker Hostetler LLP

(57) ABSTRACT

An onboard device for receiving a signal coming from an aircraft at a distance d from the device, said signal resulting from the combination of multiple propagation paths, one of the paths corresponding to the main echo of the transmitted signal, said device including an equalizer of processing depth T. The device includes means for estimating the distance covered by the second path, means for deducing therefrom a delay value τ associated with it, means for estimating when τ is greater than or equal to T the interfering signal associated with the main echo and for reducing the contribution of said signal to the total level of interference received. Also a system of communication between aircraft using the onboard device.

16 Claims, 2 Drawing Sheets

DEVICE AND SYSTEM FOR SUPPRESSION OF INTERFERENCE LINKED TO DISTANT PATHS

CROSS-REFERENCE TO RELATED APPLICATIONS

This application is a National Stage of International patent application PCT/EP2010/068777, filed on Dec. 2, 2010, which claims priority to foreign French patent application No. FR 09 05870, filed on Dec. 4, 2009, the disclosures of each of which are incorporated by reference in their entireties.

FIELD OF THE DISCLOSED SUBJECT MATTER

The invention concerns a device and a system for suppression of interference linked to distant paths and applies notably to the field of transmission between aircraft.

BACKGROUND

Communications between aircraft are usually referred to as "intra-flight" communications. The presence of a direct path between a transmitter positioned on a first aircraft and a receiver positioned on a second aircraft is the norm. Indirect paths may also be received by said aircraft. These indirect paths may be the consequence of reflection or refraction of the transmitted signal by the structure of said aircraft. They may also be the consequence of reflection of the signal from the ground or the sea, said paths being in this case usually referred to as ground echoes and sea echoes. These reflections create interference; their power may be high, in particular where sea echoes are concerned, notably when the swell is low.

The form of interference resulting from these echoes is difficult to cancel out or to equalize because an echo may be distant and time-shifted by a duration much greater than a modulation symbol, giving rise to harmful intersymbol interference.

Classic equalizers, whether they are used for terrestrial communications or for communications between aircraft, equalize the channel around a small range of delays around the signal. For example, in GSM radio communication, equalizers with five coefficients may be used to process paths subject to a delay not exceeding 20 µs. This type of equalizer is notably described by T. Lucidarme in the book entitled *Principes de radiocommunication de troisième génération*, Vuibert, 2002.

In the context of communication between aircraft and/or spacecraft, reflections caused by ground echoes and sea echoes imply long delays and are usually not processed because of the complexity this would add to the receivers.

SUMMARY

An object of the invention is notably to alleviate the drawbacks referred to above.

To this end the invention consists in an onboard device for receiving a signal s(t) coming from an aircraft at a distance d from the device, said signal s(t) resulting from the combination of a plurality of propagation paths, one of the paths corresponding to the main echo of the transmitted signal, said device including an equalizer of processing depth T. The device includes means for estimating the distance D covered by the second path, means for deducing therefrom a delay value $\tau$ associated with it, means for estimating when $\tau$ is greater than or equal to T the interfering signal associated with the main echo and for reducing the contribution of said signal to the total level of interference received.

D may be estimated using the expression:

$$D = \sqrt{d^2 + 4 \times ha \times hb}$$

in which:
ha is the altitude of the device relative to sea level or ground level;
hb is the altitude of the transmitting aircraft.

The device may be on board an aircraft or a satellite.

In one embodiment the device includes means for subtracting from the received signal s(t) a version of said signal delayed by $\tau$ in order to reduce the contribution of the main echo to the total length of interference received.

The device includes for example means for estimating the differential Doppler shift $\Delta f_{diff}$ using the following expression:

$$\Delta f_{diff}(k+1) = \left[\frac{D_{k+1} - D_k}{\Delta t \times \lambda}\right] - \left[\frac{d_{k+1} - d_k}{\Delta t \times \lambda}\right]$$

in which:
dk represents the distance between the two aircraft at the time k;
Dk represents the value of the quantity D measured at the time k;
$\Delta t$ represents the time between two successive measurements of the differential Doppler shift;
$\lambda$ represents the wavelength of the signal
and to correct the delayed version of the signal s(t) in order to obtain a signal s'(t–$\tau$).

According to one aspect of the invention a coefficient $\beta$ is applied to the signal s'(t-$\tau$), said coefficient being such that it minimizes the mean square error between a received pilot signal and the received signal s(t).

The device includes for example means for estimating the transfer function of the propagation channel in the area corresponding to the delay $\tau$ of the main echo to reduce by equalization the contribution of the main echo to the total level of interference received.

The transfer function is obtained for example by processing pilot bits present in said area.

In one embodiment of the invention the device includes conjoint pilot/data equalization means used to reduce the contribution of the main echo to the total level of interference received.

The invention also consists in a system for communication between aircraft. An aircraft of the system includes at least one device for transmitting signals with a chosen waveform and a receiver device as described above, said device enabling reception of signals using this same waveform.

According to one aspect of the invention the aircraft of the system include an altitude measuring device.

According to another aspect of the invention the altitude measuring device is a radio altimeter.

The altitude measuring device may also be a GPS receiver, for example.

The aircraft of the system include for example means for reciprocal transmission of their position estimated by their GPS receiver.

In one embodiment of the system the aircraft of the system include means for reciprocal transmission of their altitude (ha, hb).

The invention notably has the advantage of improving the robustness of communications and the bit error rate. It also has the advantage of introducing good protection against natural interference and enables the use of equalization methods that could not be used until now in the context of airborne communications.

BRIEF DESCRIPTION OF THE DRAWINGS

Other features and advantages of the invention will become apparent in the light of the following description given by way of nonlimiting illustration with reference to the appended drawings in which.

DETAILED DESCRIPTION

Figure 1:
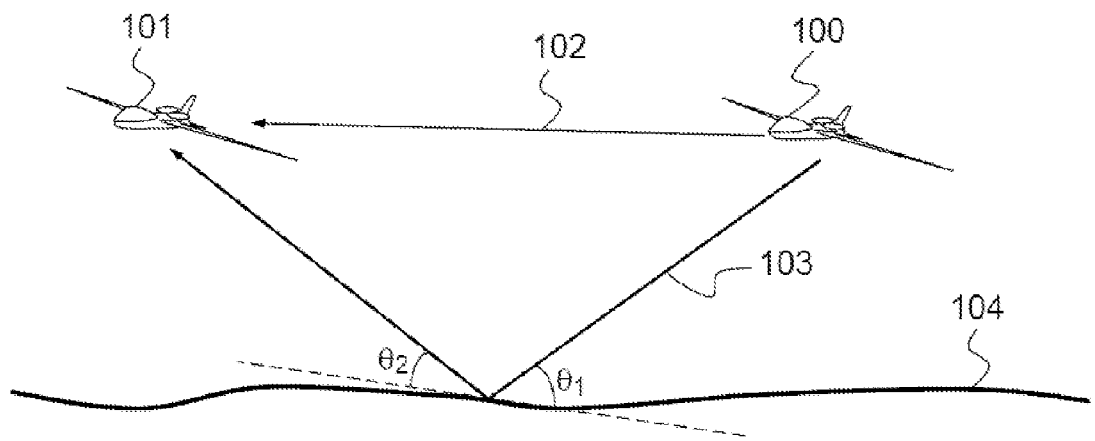
FIG. 1 shows one example of communications between two aircraft with a direct path and a sea echo.

FIG. 1 shows one example of communications between two aircraft with a direct path and a sea echo.

In this example, a first aircraft 100 includes a communication device emitting data using a chosen waveform. The resulting signal is received by a second aircraft 101 in the form of a combination of paths, notably the combination of a direct path 102 and an indirect path 103. In this example, the two aircraft 100, 101 are flying over the sea. The indirect path results, for example, from the reflection of the transmitted signal by the surface of the sea 104. In reality, a plurality of paths corresponding to sea echoes are received by the second aircraft 101, said paths being characterized by their angle of incidence $\theta_1$ on the surface of the sea and by their angle of reflection $\theta_2$. The paths resulting from this type of reflection and received at the highest power level, i.e. generating a high level of interference, are paths around the so-called optical path. The optical path is the path for which $\theta_1 = \theta_2$ and is referred to in the remainder of the description as the main echo.

The present invention proposes to identify the characteristics of the main echo in order to reduce its contribution to the received interference level.

Figure 2:
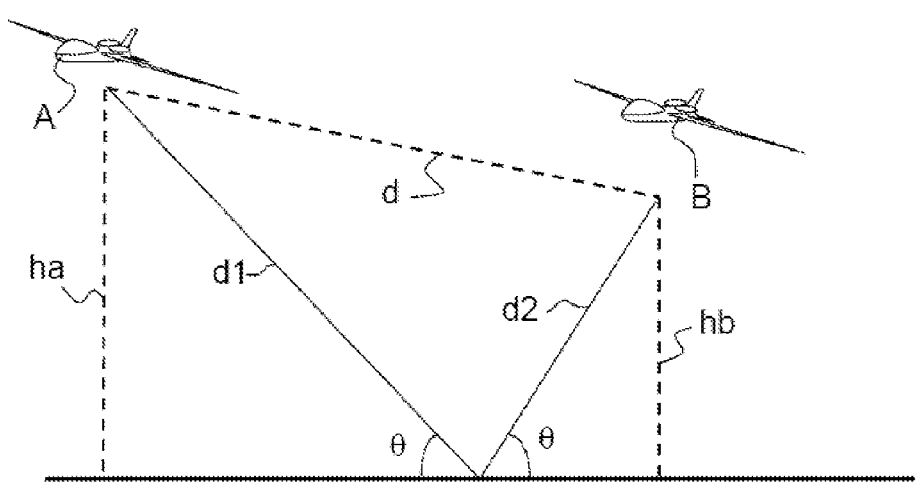
FIG. 2 represents graphically the various parameters enabling determination and characterization of the main echo present during communication between two aircraft A and B.

FIG. 2 represents graphically the various parameters enabling determination and characterization of the main echo present during communication between two aircraft A and B.

The first aircraft A is at a distance d from a second aircraft B. The first aircraft is at an altitude ha above sea level or ground level. The second aircraft B for its part is at an altitude hb above sea level or ground level. The path associated with the main echo is composed of an incident section of length d1 and a reflected section of length d2.

It is then possible to determine the quantity D=(d1+d2) using the following expression:

$$D = \sqrt{d^2 + 4 \times ha \times hb} \qquad (1)$$

To have the capacity to determine this quantity, the aircraft A and B must consequently know the value of d and the altitudes ha and hb.

An onboard altitude measuring device in the aircraft may be used for this purpose. This type of equipment is usually present in most aircraft.

Accordingly, the aircraft A measures its altitude ha using this type of device and the aircraft B measures its altitude hb also using its own measurement device.

An altitude measuring device may be, for example, a radio altimeter. This type of device when on board an aircraft indicates the height of said aircraft above the ground or the sea.

An altitude measuring device may also be, for example, a GPS receiver.

In order to obtain the quantity D, it is also necessary to know the distance d between the aircraft A and B. This distance may be obtained, for example, by synchronization of the waveform used, i.e. by measuring the round trip propagation time of the signal between the two aircraft, which must then be divided by 2.

Another way of acquiring the distance d is for the aircraft to include means for reciprocal transmission of the GPS positions P(A) and P(B) of the aircraft A and B. The distance calculation is then trivial. The altitudes ha and hb may also be transmitted from one aircraft to the other.

A third way to acquire the distance d is to use measurements from the onboard RADAR usually present in aircraft.

When the values of d, ha and hb have been acquired, it is then possible for each aircraft to determine the quantity D using the expression (1). The propagation delay $\tau$ may be deduced from this quantity using the following expression, in which c represents the speed of light expressed in m/s:

$$\tau = D/c \qquad (2)$$

Knowing the delay $\tau$, and if this delay corresponds to a magnitude greater than the depth T of the onboard equalizer, if any, specific processing is executed for the main echo. This specific processing may take a number of forms. This targeted processing advantageously enables reduction of the implementation complexity usually linked to processing paths temporally distant from the main path.

An interference cancellation type method may be used by subtraction of the interfering signal with a delayed version of the signal received directly. An example of a receiver employing this type of method is described in the remainder of the description with the aid of FIG. 4.

It is also possible to use a channel equalization method that learns the transfer function in the area corresponding to the main echo delay. In order to obtain this transfer function, the receiver uses pilot bits present in said area, for example. These pilot bits are set a priori, for example. The receiver may also, for example, request the sender by signaling to transmit one or more pilot symbols at a time corresponding to the delay $\tau$.

It is also possible to use in an iterative manner bits demodulated at the location of the interference, in other words to effect conjoint pilot/data or blind equalization.

Conjoint pilot/data equalization with two coefficients may be used, for example. The symbols $s_i$ and $s_{i+1}$ received successively may be expressed using the following expression:

$$\begin{pmatrix} s_i \\ s_{i+1} \end{pmatrix} \begin{pmatrix} p_i & r_{h+i} \\ p_{i+1} & r_{h+i+1} \end{pmatrix} \times \begin{pmatrix} h_1 \\ h_2 \end{pmatrix} \qquad (3)$$

in which:

$s_i$ represents a modulation symbol of the received signal s(t) of index i;

$p_i$ represents a pilot symbol of index i;

$r_{h+i}$ represents a demodulated symbol of index h+i derived from a received symbol $s_{h+i}$, h representing the number of symbols between $s_i$ and the received symbol $s_{h+i}$ and corresponding to the delay $\tau$;

$h_1$ represents the first coefficient of the filter modeling the propagation channel and corresponds to the received main path;

$h_2$ represents the first coefficient of the filter modeling the propagation channel and corresponds to the main echo as perceived on reception.

The expression (3) is equivalent to the expression (4) given below, S, P and H respectively representing the matrices of the expression (3):

$$S = P \times H \quad (4)$$

In this case, the matrix H is determined by simple inversion of the matrix P. If the matrix S includes more than two coefficients (rectangular matrix P), it is possible to determine on reception the coefficients of the matrix H using the following expression including the pseudo-inverse matrix of P:

$$H = (P^T \times P)^{-1} \times P^T \times S \quad (5)$$

An equalizer with two coefficients has the advantage of simplicity of implementation and enables correction of the frequency shift caused by the Doppler effect as well as equalization of distant paths.

A method such as that described in GB patent application 2 405 059 entitled *"Processing received information bits at a location measurement unit for time of arrival estimation"* may also be used. Said method notably has the objective of improving the accuracy of the channel estimate for location purposes and features a way of estimating the channel using pilot bits available in a first time period, and then the demodulated data separated by the estimated delay in a second time period, these bits being themselves considered as pilot bits during subsequent iterations.

The equalization method of the invention advantageously enables reduction of interference caused by distant paths whilst retaining a reasonable complexity of implementation.

Figure 3:
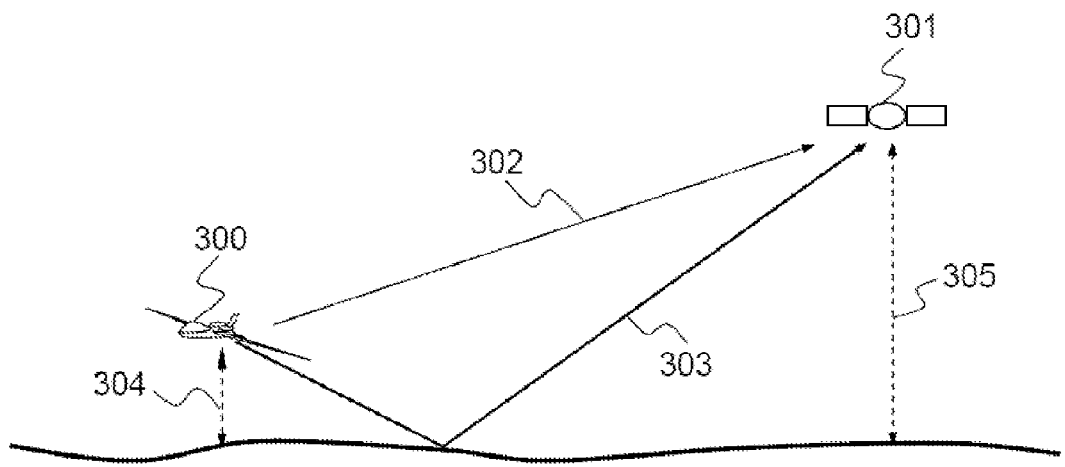
FIG. 3 shows one example of a satellite communication system employing the invention.

FIG. 3 shows one example of a satellite communication employing the invention.

In this example, an aircraft 300 flying over the sea at an altitude ha 304 transmits data to a spacecraft, for example a satellite 301 at an altitude hb 305. The satellite receives a signal resulting mainly from a combination of a direct path 302 and a main echo 303.

The satellite includes means for acquiring the distance d between the aircraft and the satellite and the altitudes ha and hb, the altitude hb. The satellite is thus able to determine the delay τ and thereafter to equalize the signal or to cancel the main echo.

Figure 4:
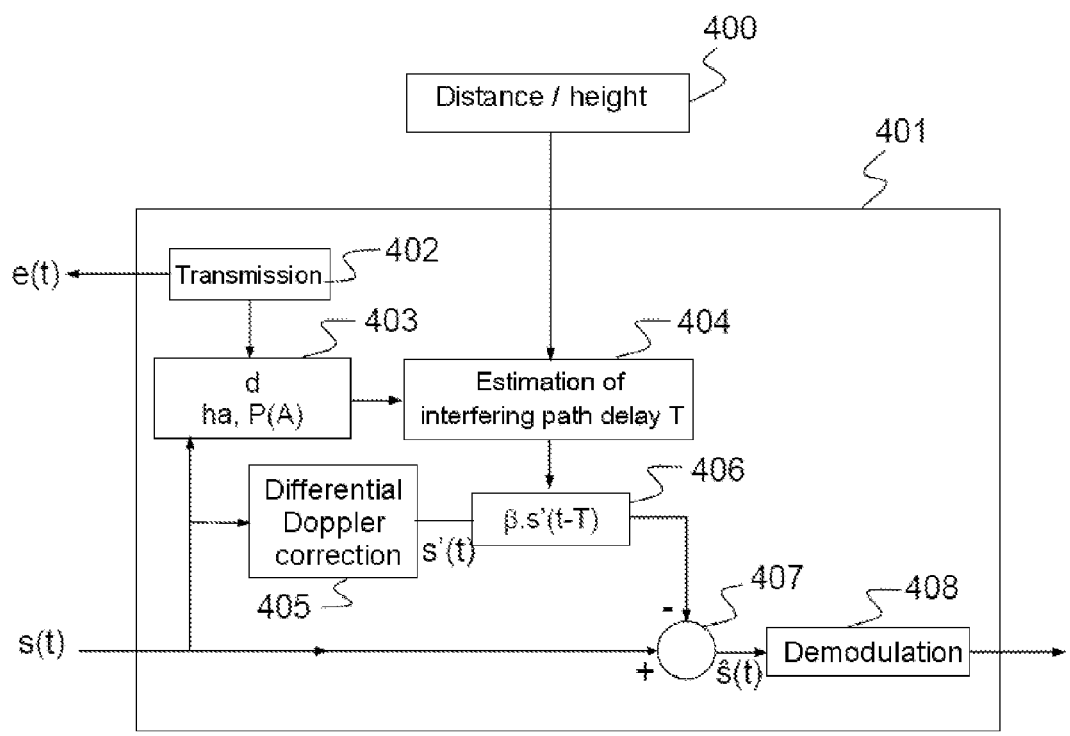
FIG. 4 shows one example of a receiver including an interference cancellation mechanism.

FIG. 4 shows one example of a receiver including an interference cancellation mechanism.

This example describes a receiver 401 on board an aircraft B. Said receiver receives a signal s(t) from an aircraft A. The signal s(t) is used as input by a parameter acquisition module 403. The objective of this module is to obtain the values of the parameters ha and P(A) that are respectively the altitude and the position of the aircraft A. This information is, for example, transmitted to the aircraft B via a signaling channel. The receiver, which comprises a GPS module, for example, knows P(B). The parameter d may thus be deduced from the known P(A) and P(B). Another way to acquire the value of d is made possible by the fact that it is usually intrinsic to the waveform and obtained by measurement of the timing advance. This timing advance between the received signal s(t) and the transmitted signal e(t) is accessible because the receiver responds at a time t known to the sender. The transmitter portion 402 of the receiver is consequently connected to the parameter acquisition module.

The height hb is supplied by a radio altimeter 400 on board the aircraft B, for example. The values of d and ha supplied by the parameter acquisition module 403 and the value of hb supplied by the radio altimeter 400 enable a delay calculation module 404 to determine the value of τ associated with the main echo.

A signal s'(t) corrected for the phase difference corresponding to the estimated frequency $f_d$ is present at the output of the Doppler correction module 405 described hereinafter. An estimate 406 of the interfering signal β×s'(t−τ) is then generated (406) and subtracted from the signal s(t) (407).

The complex coefficient β may be obtained, for example, by the method described in the book by A. Giordano and F. M. Hsu entitled "Least square estimation with application to digital signal processing", p191-194, John Wiley & Sons, 1985. Thus the complex coefficient β is obtained by a classic channel sounding method. It is chosen to minimize the mean square error between a received pilot signal and the received signal s(t). The determination of β is classic and uses the least squares method.

The signal ŝ(t) resulting from the subtraction of β×s'(t−τ) from s(t) (407) is then fed to the input of a demodulation module 408.

Whether the equalization or interference cancellation method is used, a module 405 of the invention for correction of the differential Doppler shift is used prior to the channel estimation phases. The differential Doppler shift is the difference between the Doppler shift in the direction of the alignment of the two aircraft A and B from which is subtracted the Doppler shift corresponding to the two paths of the main echo with respective lengths d1 and d2. The differential Doppler shift $\Delta f_{diff}$ may be estimated using the following expression:

$$\Delta f_{diff}(k+1) = \left[\frac{D_{k+1} - D_k}{\Delta t \times \lambda}\right] - \left[\frac{d_{k+1} - d_k}{\Delta t \times \lambda}\right] \quad (6)$$

in which:

$d_k$ represents the distance between the two aircraft at the time k;

$D_k$ represents the value of the quantity D measured at the time k;

Δt represents the time between two successive measurements of the differential Doppler shift;

λ represents the wavelength of the signal.

The invention is not limited to the field of aeronautical communications and could also be applied with advantage for the transmission of information between a fighter plane and a missile.

The invention claimed is:

1. An onboard device for receiving a signal s(t) coming from a transmitting aircraft at a distance d from the device, said signal s(t) resulting from the combination of a plurality of propagation paths, one of the paths corresponding to the main echo of the transmitted signal, said device comprising:

an equalizer of processing depth T;

means for estimating a distance D covered by the second path;

means for deducing therefrom a delay value τ associated with the distance D; and means for estimating when τ is greater than or equal to T the interfering signal associated with the main echo and for reducing the contribution of said signal to the total level of interference received.

2. The device according to claim 1, wherein the distance D is estimated using the expression:

$$D = \sqrt{d^2 + 4 \times ha \times hb}$$

in which:

ha is the altitude of the device relative to sea level or ground level; and hb is the altitude of the transmitting aircraft.

3. The device according to claim 1, further comprising means for subtracting from the received signal s(t) a version of said signal delayed by $\tau$ in order to reduce the contribution of the main echo to the total length of interference received.

4. The device according to claim 3, further comprising means for estimating a differential Doppler shift $\Delta f_{\mathit{diff}}$ using the following expression:

$$\Delta f_{\mathit{diff}}(k+1) = \left[\frac{D_{k+1} - D_k}{\Delta t \times \lambda}\right] - \left[\frac{d_{k+1} d_k}{\Delta t \times \lambda}\right]$$

in which:

$d_k$ represents a distance between the two aircraft at the time k, $D_k$ represents the value of the quantity D determined for the time k, $\Delta t$ represents a time between two successive measurements of the differential Doppler shift, and $\lambda$ represents a wavelength of the signal;

and to correct the delayed version of the signal s(t) in order to obtain a signal s'(t–$\tau$).

5. The device according to claim 4, wherein a coefficient $\beta$ is applied to the signal s'(t–$\tau$), said coefficient being such that it minimizes a mean square error between a received pilot signal and the received signal s(t).

6. The device according to claim 1, further comprising means for estimating a transfer function of the propagation channel in the area corresponding to the delay $\tau$ of the main echo to reduce by equalization the contribution of the main echo to the total level of interference received.

7. The device according to claim 6, wherein said transfer function is obtained by processing pilot bits present in said area.

8. The device according to claim 6, further conjoint pilot/data equalization means used to reduce the contribution of the main echo to the total level of interference received.

9. A satellite including the device according to claims 1.

10. An aircraft including the device according claims 1.

11. A system for communication between a plurality of aircraft comprising:

a first aircraft including at least one device for transmitting signals with a chosen waveforms; and the receiver device according to claims 1, said device enabling reception of signals using the chosen waveform.

12. The system according to claim 11, wherein the plurality of aircraft include an altitude measuring device.

13. The system according to claim 12, wherein the altitude measuring device is a radio altimeter.

14. The system according to claim 12, wherein the altitude measuring device is a GPS receiver.

15. The system according to claim 14, wherein the plurality of aircraft include means for reciprocal transmission of their position estimated by their GPS receiver.

16. The system according to claim 11, wherein the plurality of aircraft include means for reciprocal transmission of their altitude.

* * * * *